(12) United States Patent
Moore

(10) Patent No.: US 7,048,371 B1
(45) Date of Patent: May 23, 2006

(54) SPORTS TRAINING GLASSES

(76) Inventor: Gregory S. Moore, Route 2 Box 129, Sandyville, WV (US) 25275

( * ) Notice: Subject to any disclaimer, the term of this patent is extended or adjusted under 35 U.S.C. 154(b) by 62 days.

(21) Appl. No.: 10/854,835

(22) Filed: May 27, 2004

(51) Int. Cl.
*G02C 7/00* (2006.01)

(52) U.S. Cl. .......................... 351/53; 351/46; 351/103; 351/106

(58) Field of Classification Search ................. 351/53, 351/45, 46, 106, 103, 158, 41
See application file for complete search history.

(56) References Cited

U.S. PATENT DOCUMENTS

| | | | |
|---|---|---|---|
| 1,135,921 A | | 4/1915 | Ramsay |
| 2,663,021 A | * | 12/1953 | Douglass ..................... 2/433 |
| 4,472,035 A | | 9/1984 | Takamura et al. |
| 4,531,743 A | | 7/1985 | Lott |
| 4,758,285 A | | 7/1988 | Hodgson et al. |
| 4,779,971 A | | 10/1988 | Lhospice |
| 5,675,398 A | | 10/1997 | Moore |
| 5,682,220 A | * | 10/1997 | Sherman et al. ............... 351/45 |
| 6,340,228 B1 | | 1/2002 | Cummings et al. |
| D456,441 S | | 4/2002 | Jannard et al. |
| 6,513,928 B1 | | 2/2003 | Moore |
| 6,557,993 B1 | | 5/2003 | Rossin |
| 6,582,074 B1 | | 6/2003 | Chen |
| 6,601,955 B1 | | 8/2003 | Le Van Meautte |

* cited by examiner

*Primary Examiner*—Hung Xuan Dang
(74) *Attorney, Agent, or Firm*—John J. Giblin, Jr.; Anthony P. Tokarz; Bowles Rice McDavid Graff & Love LLP

(57) ABSTRACT

Disclosed is a sports training glasses for assisting a person training in a sporting endeavor requiring hand/eye coordination to focus on a specific object, such as a baseball or golf ball. The sports training glasses are comprised of a frame having a centrally disposed bridge. The bridge may be designed to rest directly on a wearer's nose, or to have engaged with it a nosepiece for resting on a wearer's nose. A pair of temple arms are articulated at either end of the frame by a flexible, integral hinge made of a shape memory material. A pair of opaque lenses are disposed along the lower edge of the frame, one opaque lens on either side of the bridge. An elongated slot, aligned horizontally, is disposed within each opaque lens. A sliding member engages with each opaque lens permitting horizontal translation behind the elongated slot. An aperture is disposed within the sliding member, within which may be disposed a transparent lens. A separate nosepiece may engage with the bridge to provide better comfort. The nosepiece is comprised of a soft elastomeric material having two lobes acutely conjoined at their upper ends, each lobe having a series of horizontal splines and a vertical tenon which engages with a vertical slot in the rear surface of the bridge.

16 Claims, 8 Drawing Sheets

SPORTS TRAINING GLASSES

BACKGROUND OF THE INVENTION

1. Field of the Invention

The invention disclosed herein relates to sports training glasses. More particularly, it relates to sports training eyeglasses having lenses with opaque peripheral regions, laterally adjustable apertures in the opaque peripheral lenses, temple arms made from a shape memory material, and an adjustable nosepiece.

2. Description of the Related Art

Many participatory sports necessitate well-developed eye-hand coordination for a player to effectively engage in that sport. Eye-hand coordination is particularly important in sports such as baseball, golf, hockey, or tennis which require the player to swing an equipment piece, such as a bat, racket, or club, and contact a ball or other playing piece. These actions require the player to see or observe the playing piece quickly, often estimating its distance, direction and velocity of travel, and activate various muscles of the body and arm to bring the apparatus into contact with the playing piece.

All these actions would be accomplished in a near instantaneous time frame and can be achieved only with well conditioned, automatic eye-hand coordination. This coordination requires a complex series of neuromuscular actions which can be performed effectively only after unconscious "muscle memory" has been developed. This "muscle memory" can be developed at the unconscious level only after many hours of concentration and practice.

To improve ones skill and ability in sports such as baseball, golf, hockey, or tennis, a player often must learn new sets of motor skills, such as more effective ways of holding and swinging a bat, club, or racket. Learning these new motor skills usually proceeds through three stages; the cognitive, the associative, and the autonomous stages.

The cognitive stage is the first stage where the player first attempts to learn the new skills and must give near total attention and concentration to his or her body movement and to the playing piece which he is trying to strike, such as the ball. Through repetition and continued practice the motor skills gradually become more automatic and less conscious until the motor skills reach the autonomous level, where the neuromuscular system acts subconsciously and requires little conscious attention.

The time period from the cognitive to the autonomous learning stages can vary from individual to individual. However, regardless of the individual, the learning period to the autonomous level can be hastened through more acute attention and concentration on the object, such as the ball, during the cognitive stage. Conversely, a player who is easily distracted and has trouble concentrating, or "keeping his eye on the ball," will spend a longer time period in the cognitive and associative stages before the new motor skills become automatic and autonomous.

Various optical aids for assisting a player to "keep ones eye on the ball" are known in the prior art. U.S. Pat. No. 1,135,921, awarded to Ramsay on Apr. 13, 1915, discloses an optical instrument for use in playing the game of golf or like ballgames. The instrument consists of pair circular, opaque eye-shades connected by an adjustable frame. Each eye-shade has a small aperture located slightly off-center. The apparatus is worn like a typical pair of glasses and the small aperture in the opaque lenses assist the wearer in focusing on a ball and eliminates other distractions. However, the Ramsay invention is difficult and cumbersome to use when aligning the apertures with the distance between the pupils of the wearer.

Similarly, U.S. Pat. No. 5,675,398, awarded to Moore on Oct. 7, 1997, provides for eyeglasses having opaque lenses with a small transparent aperture which again assists the wearer to focus on a desired point and eliminate other distractions. Similar to Ramsay, the Moore invention requires the entire opaque lens to be adjusted to account for varying distances between the pupils of the wearer.

A pair of eyeglasses is desirable which provide for a small moveable aperture within an overall opaque lens but in which the aperture's position may be adjusted without having to adjust the entire lens.

SUMMARY OF THE INVENTION

To remedy and improve upon the deficiencies of the prior art, disclosed herein is an invention of sports training glasses, comprised of a frame, a bridge centrally disposed on the frame, a nosepiece disposed on the nosepiece, a pair of temple arms disposed on either end of the frame, a pair of opaque lenses disposed on the lower edge of the frame on either side of the nosepiece, wherein each opaque lens is comprised of a horizontal slot approximately centrally located and a pair of tracks mounted to the upper and lower edges of the horizontal slot, on the interior side of the lens. An opaque sliding member with an aperture registers within the tracks and may translate horizontally within the tracks, so as to position the aperture as desired. A transparent lens may be disposed within the aperture.

The nosepiece, which supports the sports training glasses on the bridge of the user's nose is adjustable vertically by a tenon which engages in and slides along a vertical groove in the frame. The nosepiece has two lobes in an inverted-"V" shape which fit on either side of the bridge of the wearer's nose. Each lobe of the nosepiece is comprised of a vertical array of horizontal splines. These splines can deform, elastically, and when pressed onto the bridge of a wearer's nose, bend to conform to the individual shape of the wearer's nose. This provides both a more comfortable as well as a more secure fit of the nosepiece against the bridge of the wearer's nose. The temple arms are preferably comprised of a shape memory alloy which can deform elastically and return to its original shape without permanent deformation yet have the strength of metal alloys or engineering plastics. The temple arms articulate with the frame with an integral shape-memory hinge. The normal, undeformed position of the hinge maintains the temporal side arms flexed behind the frame. The hinge may be elastically deformed in the horizontal plane, allowing the temporal side arms to extend orthogonally to the frame and beyond, and thereby permitting the emplacement of the sports vision glasses on a user's head with the temple arms extending around the head and over the ears. Compression in the hinge corrugations maintains pressure of the temple arms against the temples of the wearer's head. When the sports vision glasses are removed, the hinge corrugations re-expand elastically without any permanent deformation, thereby returning the temple arms to the initial flexed disposition.

The sliding member sliding within the tracks on the interior of each of the opaque lenses provides an easier means for adjusting the apertures to the interpupillary distance of the wearer. The surrounding opaque lenses remain fixed to the frame and the smaller sliding member is adjusted horizontally in the track to align with the wearer's pupils.

One object of this invention is to provide for a pair of sports training glasses which can assist a wearer in focusing upon a single point object without distractions from peripheral surroundings.

Another object of this invention is to provide an easier means for adjusting the horizontal position of the aperture in the lenses.

Another object of this invention is to provide a comfortable and adjustable means of support for the sports training eyeglasses on a wearer's nose.

Another object of this invention is to provide sports training eyeglasses with temple arms constructed of shape memory material.

These and other objectives and advantages of the invention will become apparent from the description which follows. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE INVENTION

Figure 1:
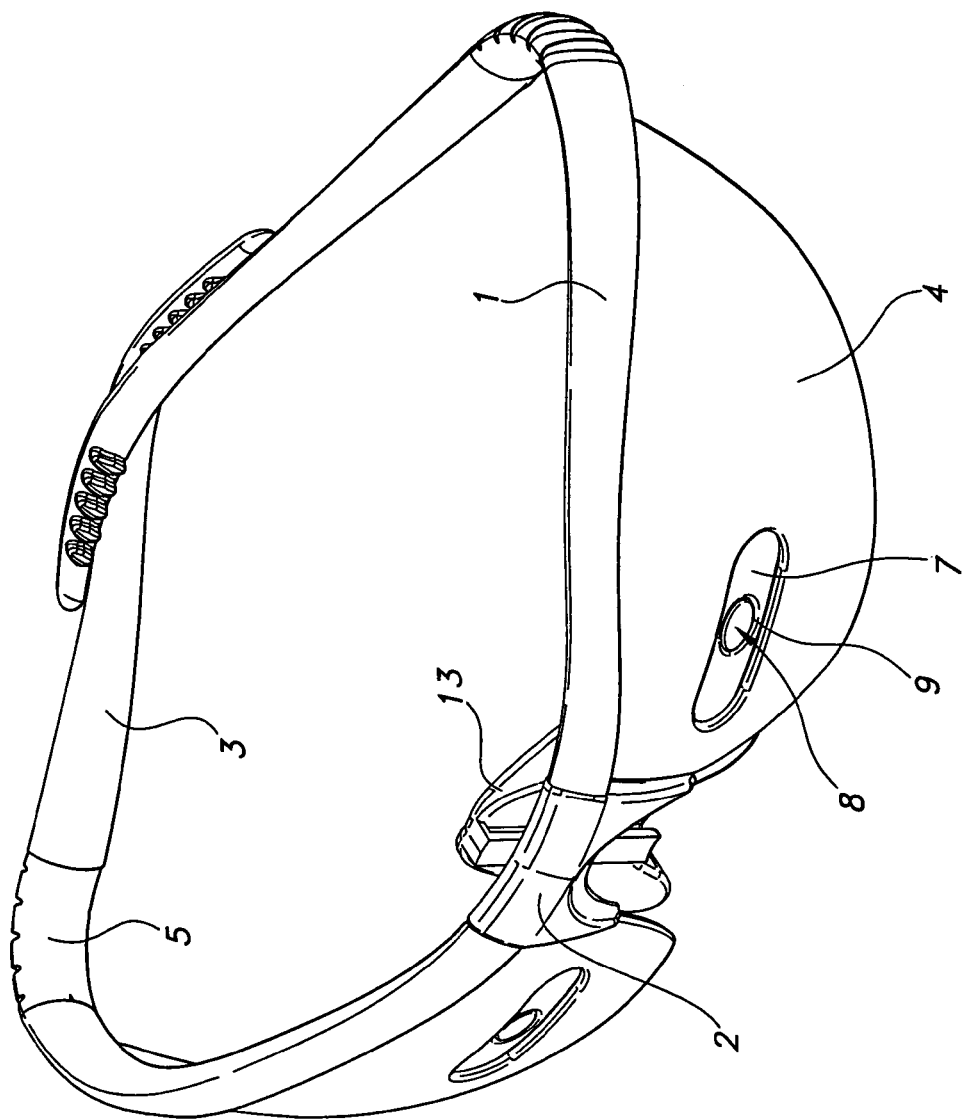
FIG. 1 is an isometric view of the front of the sports training glasses, with the temple arms shown in the folded position.
Figure 2:
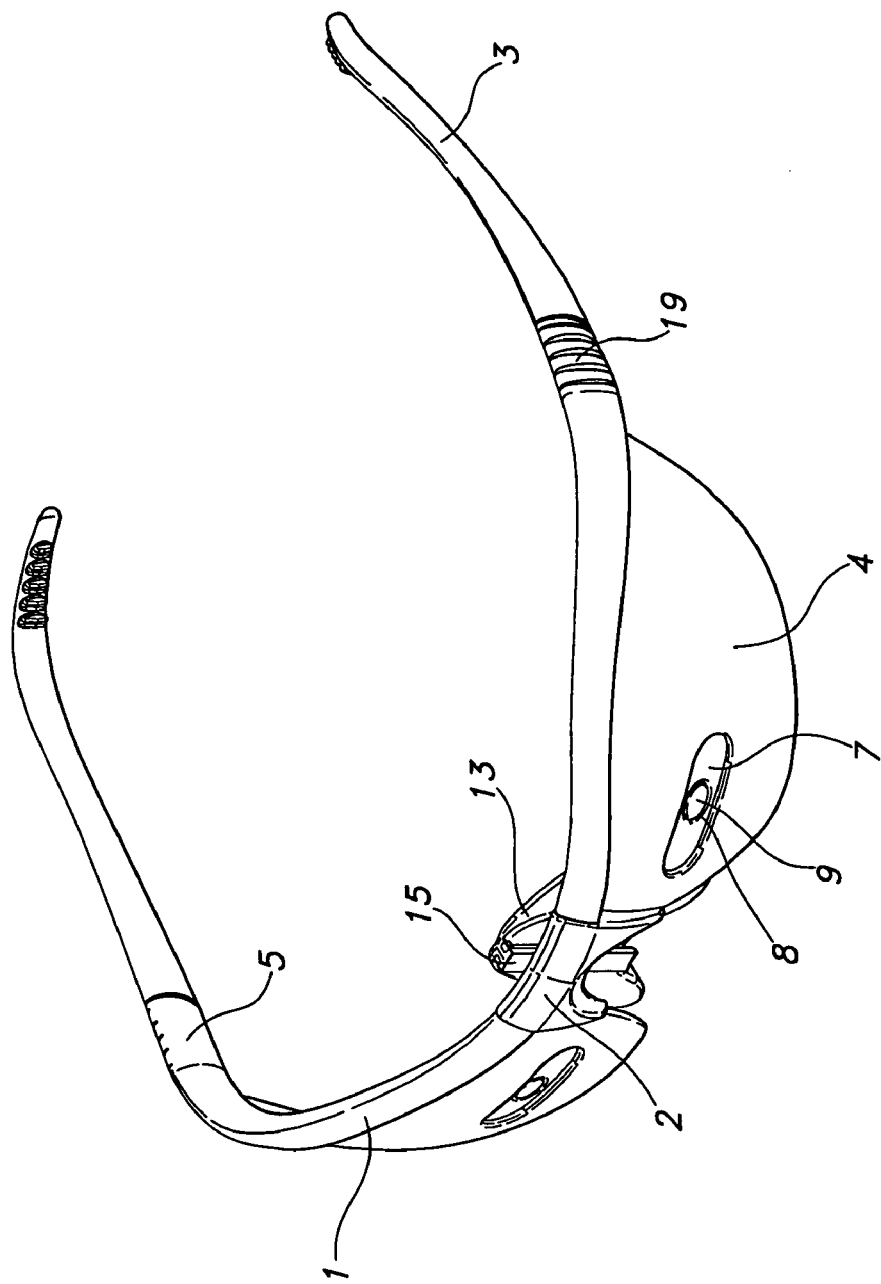
FIG. 2 is an isometric vies of the front of the sports training glasses, with the temple arms shown in the open position.
Figure 3:
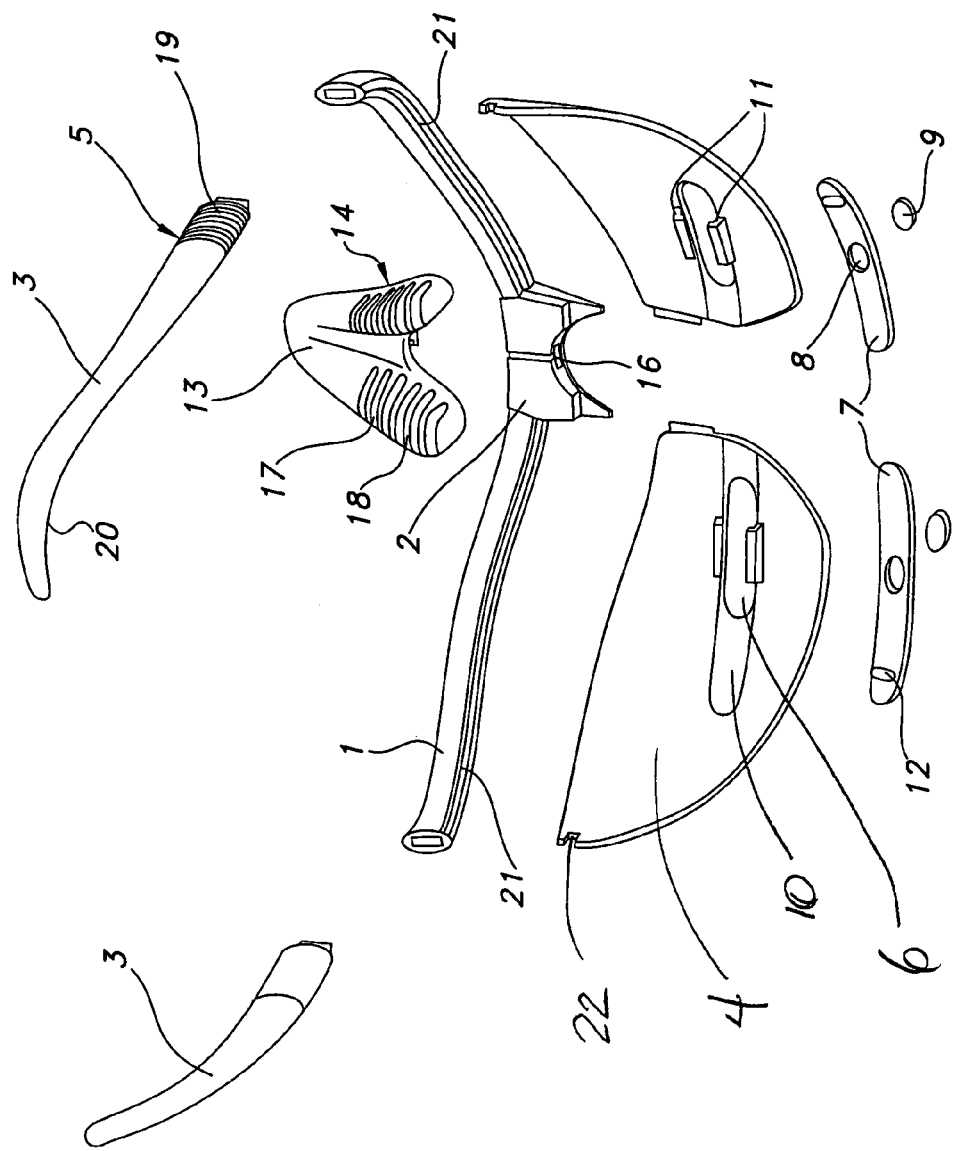
FIG. 3 is an exploded diagram of the sports training glasses, as viewed from the rear and below.
Figure 4:
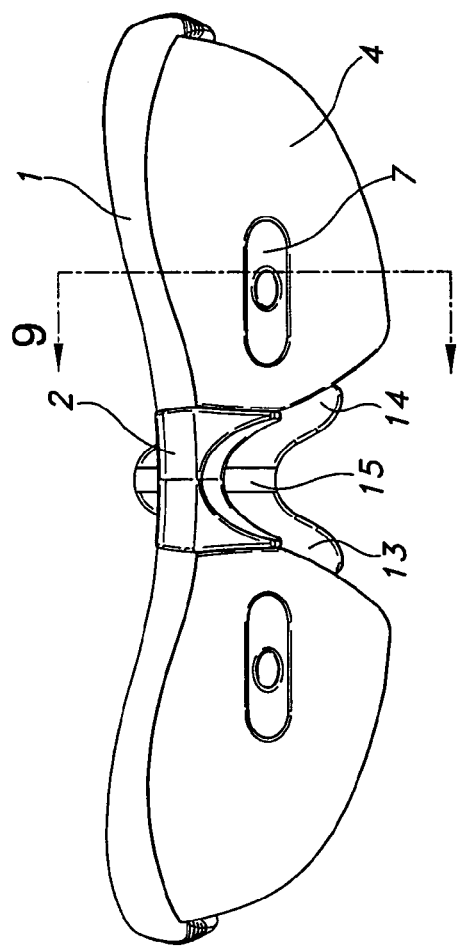
FIG. 4 is an elevational view of the front of the sports training glasses.

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

As shown in FIGS. 1 through 7, an improved sports training glasses is comprised of, in part, an elongated frame 1 and a bridge 2. The bridge 2 is located at the middle of the frame 1. The bridge 2 may be shaped for resting directly on a wearer's nose, or, in the preferred embodiment, serves as a base to which an additional nosepiece 13 is attached. A pair of temple arms 3 is disposed at either end of the frame 1. A pair of opaque lenses 4 is disposed on the lower edge or surface of the frame 1, on either side of the bridge 2. The opaque lenses 4 are rigidly, but detachably, affixed to the frame 1. Each opaque lens 4 has a horizontal channel 10 in its rear surface, and an elongated slot 6 through the opaque lens 4 within horizontal channel 10. A sliding member 7 is in communication with the rear surface of each opaque lens 4, covering the elongated slot 6 and capable of translating horizontally behind the elongated slot 6 within the channel 10. The sliding member 7 is disposed within a pair of brackets 11, each of which is attached to the upper or lower edges of the elongated slot 6. An aperture 8 is centrally disposed in the sliding member 7, through which a narrow field of vision is provided for the wearer. A transparent lens 9 may be disposed within the aperture 8.

The frame 1 provides the main support for the elements of the sports training glasses, and spans horizontally across the brow of the wearer's face. It is substantially an arcuate linear member with, preferably, an oval cross section. A groove 21 is disposed along the bottom edge of the frame 1 on either side of the bridge 2, within which registers the top edge of the opaque lenses 4.

Figure 8:
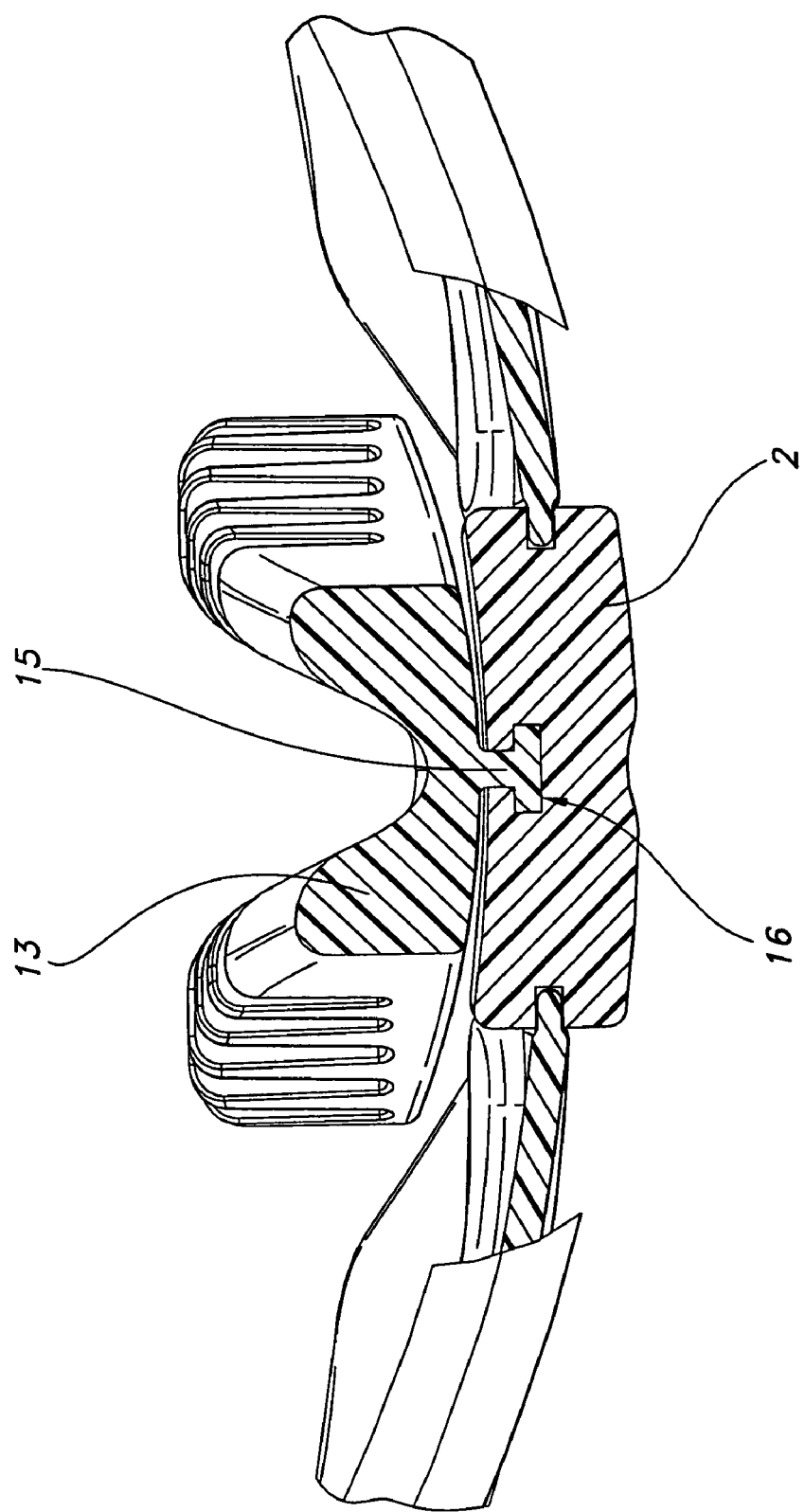
FIG. 8 is a horizontal sectional view of the bridge and nosepiece area of the sports training glasses.

The bridge 2 is disposed at the center of the frame 1. This bridge 2 may be formed with an arcuate or concave lower surface so as to comfortably rest upon the bridge of the nose of the wearer. Alternatively, an additional means may be provided attached to the bridge 2 for supporting the sports training glasses on the bridge of the wearer's nose. These may include, for example, small nose pads on the ends of pad arms which are rigidly or adjustably attached at the opposite ends of the pad arms to the bridge 2. In the preferred embodiment, a separate nosepiece 13 is provided to rest on the wearer's nose. In this embodiment, the bridge 2 will have a means of securing a nosepiece 13 to it. In the preferred embodiment, this means of securing the nosepiece 13 is comprised of a vertical slot or mortice 16 in the interior surface, i.e., that surface directed towards the wearer's face of the bridge 2, within which a tenon 15 on the nosepiece 13 snugly registers. Preferably the mortice 16 in the bridge 2 would have a cross-sectional shape that is flared or pitched internally, so that the mortice 16 is wider at some point below than at the surface, thereby preventing the tenon 15 from sliding out of the mortice 16, but still permitting vertical translation. As shown in FIG. 8, one cross-sectional shape is in the form of an inverted "T". The corresponding tenon 15 on the nosepiece 13 has a "T" shaped cross section that registers with the mortise 16 by sliding in from the top or bottom. A dovetail is another acceptable cross-sectional shape for the mortise 16 and tenon 15. The nosepiece 13 can then slide vertically as needed to position the frame 1 vertically to align the apertures 8 in the transparent lenses 9 disposed on the frame 1 (as discussed below) with the wearer's pupils when the sports training glasses are positioned with the nosepiece 13 resting comfortably on the wearer's nose.

In the preferred embodiment the nosepiece 13 has an overall triangular shape, with its apex pointed upward and with generally rounded corners, and with a concave lower edge. The two descending sides of this triangle, which form an inverted "V", are formed into expanded lobes 14 designed to fit comfortably around the bridge of the nose. Each of the two lobes 14 has a plurality of horizontal kerfs 17 or thin slots, extending from the inner surface of each lobe 14 through most of the thickness of the lobe 14. The solid portion of the nosepiece 13 between each kerf 17 thus forms a "finger" or spline 18 which can flex and provide friction against the bridge of the nose without creating undue or uncomfortable pressure on the wearer's nose. The nosepiece 13 is molded from a soft elastomer, preferably sanoprene, using method known in the art. To engage the bridge 2, as described above, a tenon 15 is disposed on the exterior side of the nosepiece 13, aligned vertically and with a cross section which will register with the mortise 16 incised in the interior surface of the bridge 2.

At either end of the frame 1 is disposed one of a pair of temple arms 3. Each temple arm 3 is elongated in shape is and designed to hold the frame 1 in place on a wearer's face by securing around the upper surface of the wearer's ears. Various styles of temple arms 3 are known in the art and may be used with the invention, such as skull temples, comfortcable temples, riding bow temples, spring-hinged temples or library (or paddle) temples. In the preferred embodiment, the temple arms 3 have a row of nodes 20 along the interior surface near the distal end of the temple arms 3, which enhance the grip of the temple arms 3 against the head and ears of the wearer.

The temple arms 3 may be integral with the frame 1 or may be pivotally attached at the proximal end of each temple arm 3 to the end of the frame 1 with a hinge 5. The hinge 5 may include a spring which flexes the temple arms 3 and maintains them against the rear surface of the frame 1.

In the preferred embodiment the temple arms 3 are articulated with the frame 1 by an integral monolithic hinge 5, molded together with the temporal side pieces. In this embodiment, the integral hinge 5 is formed by a series of vertical corrugations 19 on the exterior surface of each hinge 5. The reduced thickness between the opposing grooves in the corrugation 19 permits a small degree of flexion. As shown in FIG. 1, the hinges 5 in the temple arms 3 are molded so that the temple arms 3 are in a folded position when there is no stress on the temple arms 3. To use the sports training glasses, the temple arms 3 are extended to the position, shown in FIG. 2. This compresses corrugations 19 of the hinge 5, which, when the temple arms 3 are released, forces the temple arms 3 to the original flexed configuration shown in FIG. 1. This same force in the extended hinges 5 presses the temple arms 3 against the temples of the wearer's head. Together with the additional friction provided by the nodes 20, this prevents the sports training glasses from dislodging from the wearer's head during sports activities. When the sports vision glasses are removed from the wearer's head, stress imparted into the hinge causes the temple arms 3 to return to the initial, flexed disposition behind and parallel to the frame 1 as shown in FIG. 1.

In the preferred embodiments, the temple arms 3 are fabricated of a material that may elastically strain without permanent deformation. Most preferably, the temple arms 3 are manufactured from nylon resin.

Figure 9:
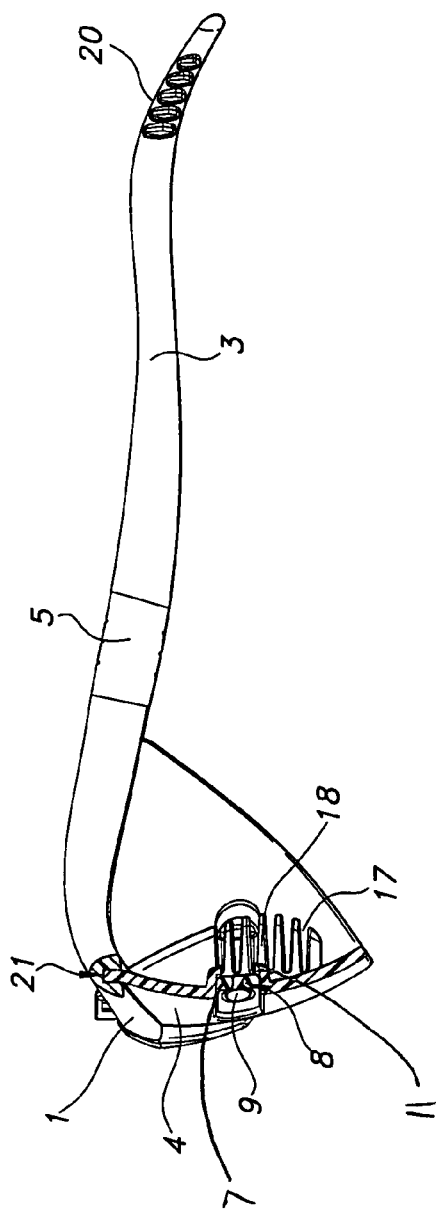
FIG. 9 is a vertical sectional view at the end of the frame of the sports training glasses.
Figure 10:
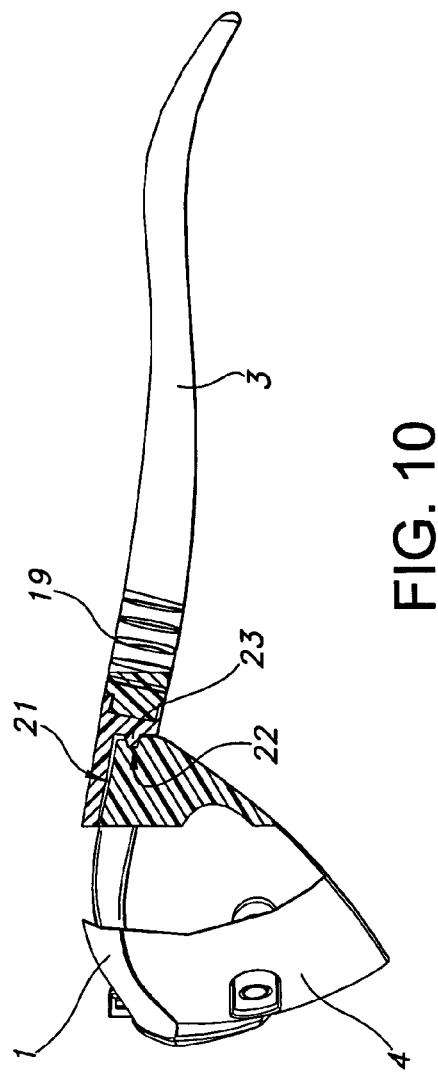
FIG. 10 is a vertical sectional view through the left lens of the sports training glasses.

A pair of opaque lenses 4 is disposed on the frame 1, on either side of the bridge 2. Each opaque lens 4 is rigidly secured to the lower edge of the frame 1. This is preferably accomplished by a groove 21 disposed along the bottom edge of the frame 1. As shown in FIGS. 9 and 10, the top edge of the opaque lens 4 registers within this groove 21. An indent 22 in the top outside corner of the opaque lens 4, best visible in the exploded view in FIG. 3, engages with a locking tab 23 disposed at the end of the groove 21, as shown in FIG. 10. This locking tab 23 rigidly secures the opaque lens 4 to the frame 1, while permitting replacement of the opaque lens 4, if necessary. The opaque lenses 4 are sufficiently large to cover substantially the entire field of vision of the wearer. The lenses 4 are sufficiently opaque to preclude sight of any image or distracting light through them by a wearer. As thus defined, the term opaque may include translucent or transparent materials of a dark shade.

Each opaque lens 4 has an elongated slot 6 through the thickness of the opaque lens 4. The elongated slot 6 is aligned laterally, parallel to the frame 1, and disposed substantially centrally on the opaque lens 4. The elongated slot 6 is preferentially 1/4 to 2 inches long by 1/8 to 3/4 inches wide, but may be made in other sizes to accommodate the facial dimensions of a variety of potential wearers. More preferably, the elongated slot is 1 inch long by 1/4 inch wide.

Incised in the interior surface of each of the opaque lenses 4 is a channel 10. The channel 10 is elongated and disposed coaxially with the elongated slot 6. The channel 10 is at least as wide, and preferably equally as wide as the elongated slot 6, and overall at least approximately three times as long as the elongated slot 6. It may be longer. The channel 10 is centered longitudinally and laterally on the elongated slot 6.

Disposed at the top and bottom edges of the channel 10 are brackets 11. The brackets 11, together with the channel 10, form a conduit within which a sliding member 7 can slide or translate laterally while held in place behind the elongated slot 6.

A sliding member 7, which is a thin rectilinear elongated plate, is posited within the channel 10. The width of the sliding member 7 is equal to that of the channel 10, and the thickness of the sliding member 7 to the distance between the bottom surface of the channel 10 and bottom of the bracket 11. The length of the sliding member 7 is substantially equal to the difference between the length of the channel 10 and the length of the elongated slot 6. An aperture 8 through the thickness of the sliding member 7 is centrally disposed in the sliding member 7. The diameter of the aperture 8 is sufficient to provide a narrow field of view for the wearer of the sports training glasses. In the preferred embodiment, the aperture 8 is elliptical and 1/4 inch long by 1/8 inch high, but may be of other sizes and shapes, including circular, to accommodate the particular needs of a wearer. A transparent lens 9 is preferably disposed within the aperture 8 to protect the wearer's eye from dust or other particles. The transparent lens 9 will generally be a piano (i.e., non-correcting lens), but may have convex, concave or cylindrical surfaces to suit the vision deficiencies of a particular wearer.

Figure 5:
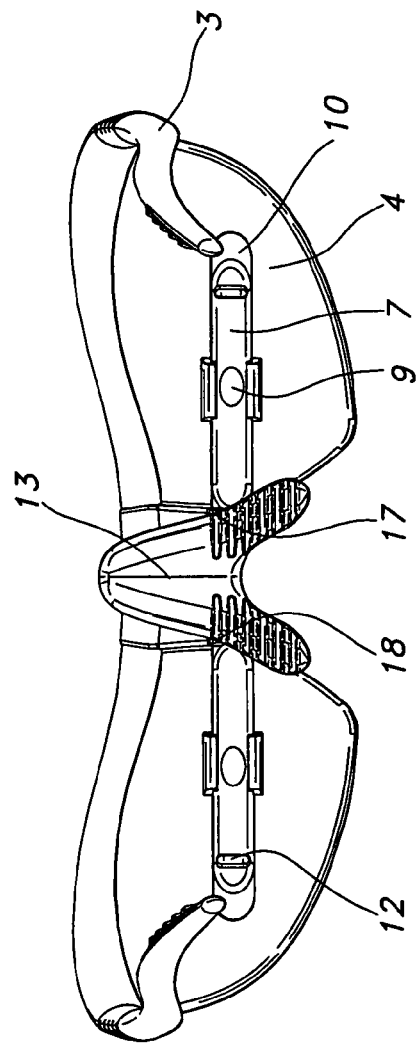
FIG. 5 is an elevational view of the rear of the sports training glasses.
Figure 6:
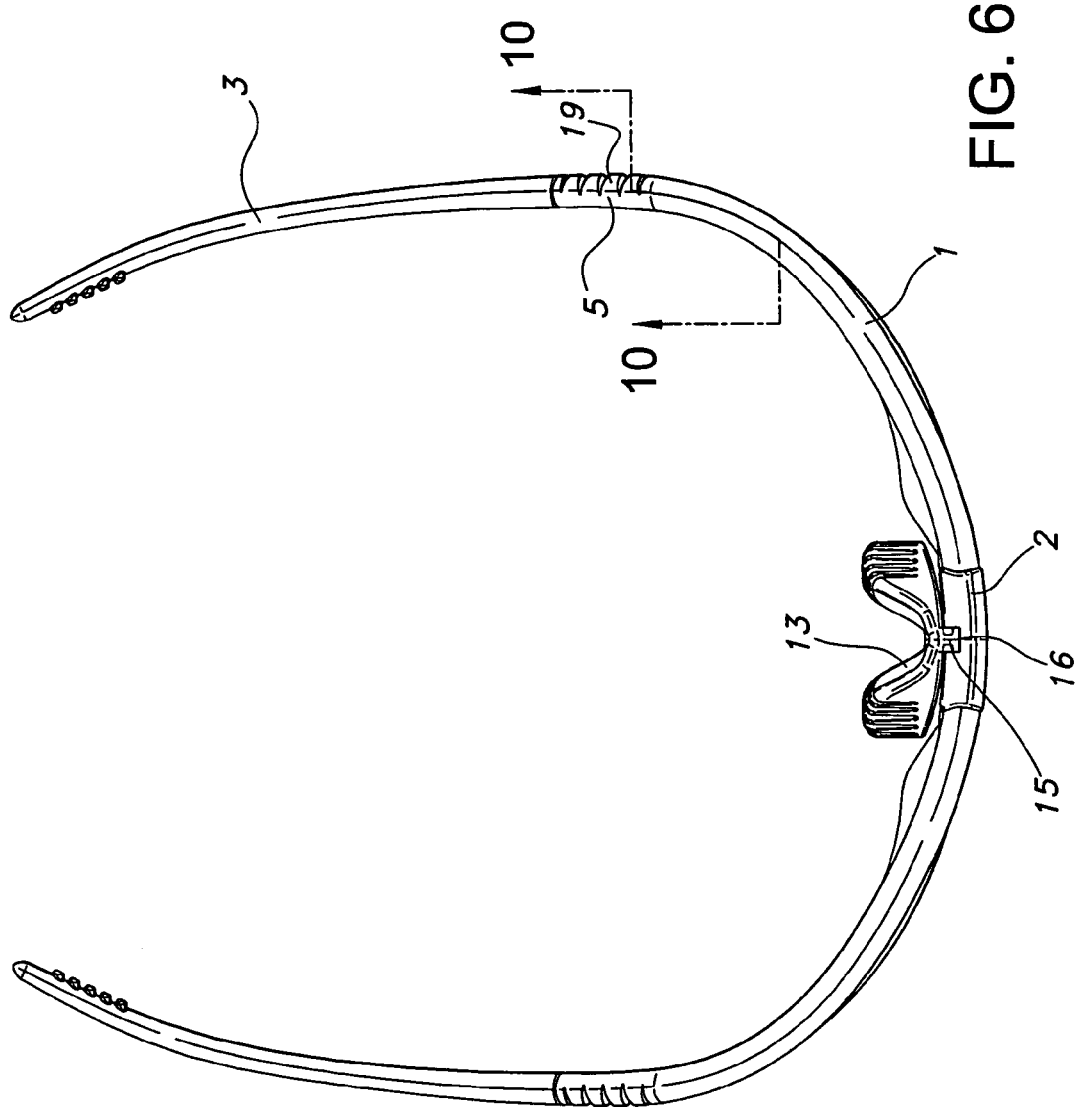
FIG. 6 is a plan view of the top of the sports training glasses.
Figure 7:
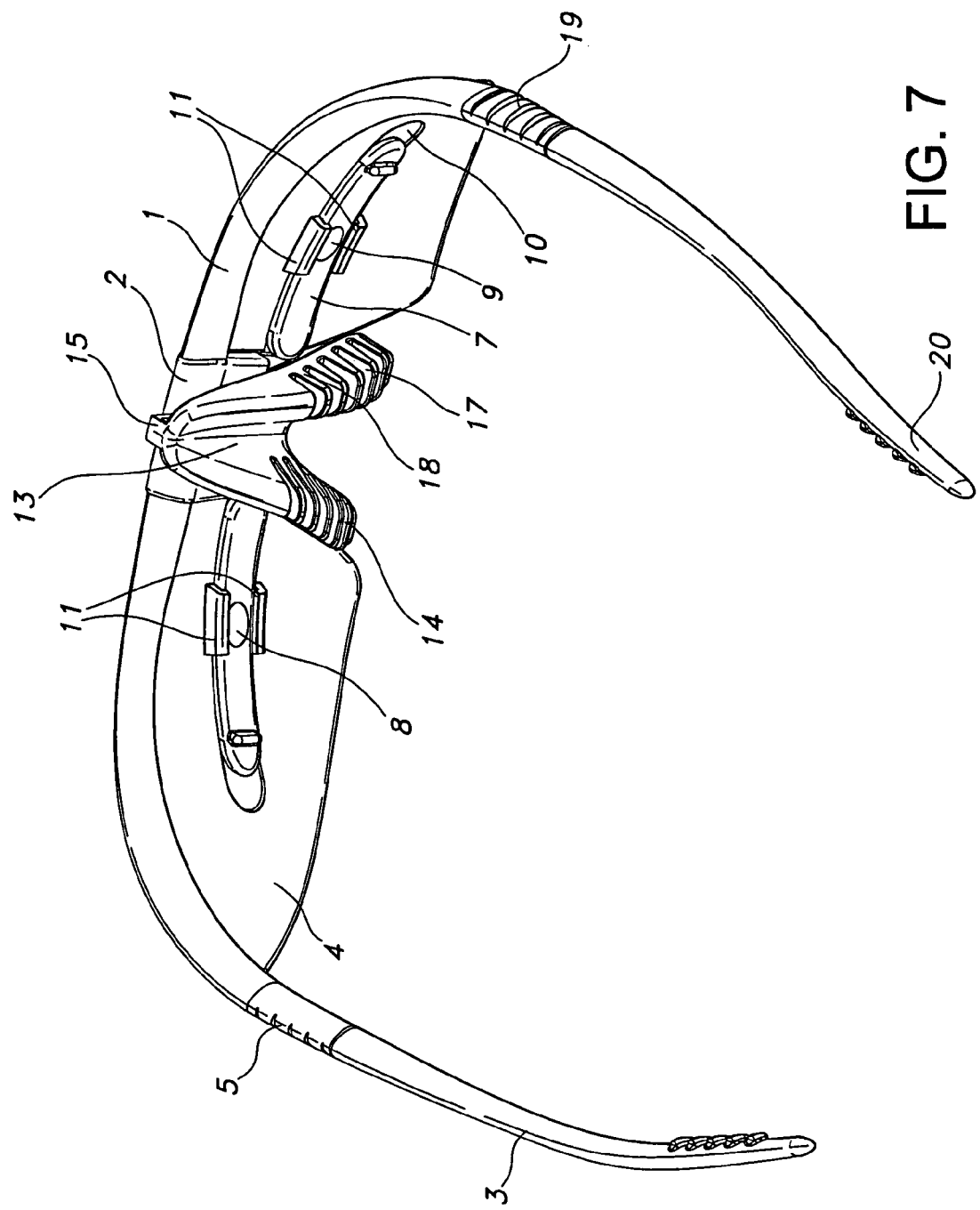
FIG. 7 is an isometric view of the rear of the sports training glasses, viewed from the above right.

As best discerned in FIGS. 5 and 7, the sliding member 7 is installed longitudinally into the conduit created by the channel 10 and the brackets 11, behind the elongated slot 6. When fabricated as described herein, the aperture 8 may be repositioned with respect to the elongated slot 6 by sliding or translating the sliding member 7 laterally along the channel 10. When the sliding member 7 is translated completely in one direction, one end of the sliding member 7 will appose one end of the channel 10, the aperture 8 will be adjacent to one end of the elongated slot 6, and the half of the sliding member 7 adjacent to its opposite end will completely cover the remainder of the elongated slot 6. The inverse occurs when the opposite end of the sliding member 7 is repositioned to appose the opposite end of the channel 10. Thus, the aperture 8 in the sliding member 7 may be positioned at any point within, but not outside, the entire elongated slot 6 while the sliding member 7 covers the entire remainder of the elongated slot 6. A tab 12 may be disposed proximate to the lateral ends on the interior surface of each sliding member 7, to facilitate translation of the sliding member 7 within the channel 10 with pressure from one's finger pressed against either side of the tab 12.

The sports training glasses are used by extending the temple arms 3, straddling the sides or temples of the wearer's head with the temple arms 3, placing the bridge 2, or nosepiece 13, if so provided, onto the bridge of the wearer's nose, and engaging the distal ends 20 of the temple arms 3 with the upper surfaces of the wearer's ears. The nosepiece 13 is adjusted vertically so as to align the apertures 8 in the sliding member 7 vertically with the horizontal center axis of the pupils of the wearer's eyes. Each sliding member 7 is then positioned horizontally to align the aperture 8 with the vertical center axis of each eye.

The sliding members 7 can be properly aligned by having the wearer stare directly at a fixed point approximately 6 to 20 feet away, while donning the sports training glasses. While keeping a fixed position of the head, the nosepiece 13 is first adjusted to bring the horizontal plane of vision at the same level as the fixed point. The sliding members 7 are then, in turn, translated horizontally until the fixed point is in view within the center of the field of vision.

While various embodiments of the invention have been described above, it should be understood that they have been presented by way of example, and not limitation. It will be apparent to person skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. A sports training glasses, comprised of:
   (a) a frame, having opposite ends and a bridge centrally disposed in the frame,
   (b) a pair of temple arms, each of which having an anterior end and a posterior end, said anterior end engages with one opposite end of said frame;
   (c) a pair of opaque lenses, each lens having an exterior and an interior surface, wherein an upper edge of each opaque lens engages with the frame on either side of the bridge, and wherein each opaque lens is further comprised of:
      (i) an elongated slot disposed through the thickness of the slot and orientated with its elongated axis parallel to the upper edge of the opaque lens,
      (ii) a sliding member,
      (iii) an aperture disposed through the thickness of the sliding member,
      wherein, said sliding member engages with the interior surface of the opaque lens overlaying the slot and capable of transverse translation parallel to the frame.

2. The sports training glasses of claim 1, wherein the opaque lens is further comprised of a channel disposed in the rear surface of the opaque lens within which translates the sliding member.

3. The sports training glasses of claim 1, further comprising a pair of brackets disposed on the rear surface of each opaque lens for retaining each sliding member within the channel.

4. The sports training glasses of claim 1, wherein the frame has a groove along the posterior edge, into which engages the anterior edge of the opaque lens.

5. The sports training glasses of claim 1, further comprised of a locking tab on the lateral edge of the opaque lens and a recess in the groove in the frame, into which the locking tab registers.

6. The sports training glasses of claim 1, wherein the engagement of the temporal side member with the end of the frame is articulated.

7. The sports training glasses of claim 6, wherein the articulation of the temporal side member with the end of the frame is by means of a hinge.

8. The sports training glasses of claim 7, wherein the hinge is integral with the temporal side member and is comprised of a plurality of corrugations orthogonal to the axis of the temporal side member and aligned in parallel along the exterior surface of the temporal side member.

9. The sports training glasses of claim 8, wherein the temple arms with integral hinge are manufactured of nylon polymer resin.

10. The sports training glasses of claim 1, wherein a transparent lens is disposed within the aperture in the sliding member.

11. The sports training glasses of claim 1, wherein each sliding member is further comprised of a tab on the surface opposite from the opaque lens, disposed proximate to the lateral end of the sliding member.

12. The snorts training glasses of claim 1, further comprising a nosepiece which engages with the center of the frame of said glasses, comprised of two rounded lobes conjoined at their upper ends, forming a concave lower surface for conforming with the surface of the bridge of a wearer's nose, said lobes having a greater thickness at their lower ends, and having a plurality of transverse kerfs within the lobes.

13. The sports training glasses of claim 12, wherein the nosepiece is manufactured of sanoprene.

14. The sports training glasses of claim 12, further comprised of engagement means for securing the nosepiece to the frame while facilitating vertical positioning of the nosepiece.

15. The sports training glasses of claim 12, wherein the nosepiece is engaged with the bridge of the sports training glasses.

16. The sports training glasses of claim 15, wherein the engagement of the nosepiece with the bridge provides for vertical positioning of the nosepiece.

* * * * *